(12) United States Patent
Cheng et al.

(10) Patent No.: US 12,079,970 B2
(45) Date of Patent: Sep. 3, 2024

(54) METHODS AND SYSTEMS FOR SEMANTIC SCENE COMPLETION FOR SPARSE 3D DATA

(71) Applicant: HUAWEI TECHNOLOGIES CO., LTD., Guangdong (CN)

(72) Inventors: Ran Cheng, Shanghai (CN); Christopher George-R Agia, Stouffville (CA); Bingbing Liu, Markham (CA); Yuan Ren, Thornhill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 17/492,261

(22) Filed: Oct. 1, 2021

(65) Prior Publication Data

US 2023/0105331 A1 Apr. 6, 2023

(51) Int. Cl.
| | |
|---|---|
| *G06T 5/77* | (2024.01) |
| *G06F 18/21* | (2023.01) |
| *G06F 18/24* | (2023.01) |
| *G06N 3/04* | (2023.01) |
| *G06T 7/521* | (2017.01) |

(Continued)

(52) U.S. Cl.
CPC ............ *G06T 5/77* (2024.01); *G06F 18/2163* (2023.01); *G06F 18/24* (2023.01); *G06T 7/521* (2017.01); *G06V 20/56* (2022.01); *G06V 30/274* (2022.01); *G01S 7/4808* (2013.01); *G01S 17/42* (2013.01); *G01S 17/89* (2013.01); *G06N 3/04* (2013.01); *G06T 2207/10028* (2013.01); *G06T 2207/20084* (2013.01); *G06T 2207/30252* (2013.01)

(58) Field of Classification Search
CPC ..................... G06T 5/005; G06T 7/521; G06T 2207/10028; G06T 2207/20084; G06T 2207/30252; G06N 3/04; G06V 20/56; G06V 30/274; G06F 18/2163; G06F 18/24

See application file for complete search history.

(56) References Cited

U.S. PATENT DOCUMENTS

| | | | |
|---|---|---|---|
| 2020/0159225 A1* | 5/2020 | Zeng | G05D 1/0212 |
| 2022/0147791 A1* | 5/2022 | Yao | G06N 3/0495 |

OTHER PUBLICATIONS

Rist et al., "Semantic Scene Completion Using Local Deep Implicit Functions on LiDAR Data", IEEE Transactions on Pattern Analysis and Machine Intelligence, vol. 44, No. Oct. 10, 2022. Date of publication Jul. 7, 2021. Online dated Apr. 12, 2021: https://arxiv.org/pdf/2011.09141.pdf (Year: 2021).*

(Continued)

*Primary Examiner* — Sing-Wai Wu
(74) *Attorney, Agent, or Firm* — HUAWEI TECHNOLOGIES CO., LTD.

(57) ABSTRACT

Methods and systems for performing semantic scene completion of sparse 3D data are described. A frame of sparse 3D data is preprocessed into a sparse 3D tensor and a sparse 2D tensor. A partially completed 3D tensor is generated from the sparse 3D tensor using a 3D prediction network, and a semantically completed 2D tensor is generated from the sparse 2D tensor using a 2D prediction network. The partially completed 3D tensor is completed to obtain a semantically completed 3D tensor by assigning a given class label, which has been assigned to a given pixel in the semantically completed 2D tensor, to a voxel at a corresponding x-y coordinate in the partially completed 3D tensor.

15 Claims, 5 Drawing Sheets

(51) Int. Cl.
*G06V 20/56* (2022.01)
*G06V 30/262* (2022.01)
*G01S 7/48* (2006.01)
*G01S 17/42* (2006.01)
*G01S 17/89* (2020.01)

(56) References Cited

OTHER PUBLICATIONS

Roldao et al., "3D Semantic Scene Completion: a Survey", International Journal of Computer Vision (2022) 130:1978-2005. Online dated Jul. 12, 2021: https://arxiv.org/pdf/2103.07466.pdf (Year: 2021).*
J. Behley, M. Garbade, A. Milioto, J. Quenzel, S. Behnke, C. Stachniss, and J. Gall. "SemanticKITTI: A Dataset for Semantic Scene Understanding of LiDAR Sequences". In Proceedings of the IEEE International Conference on Computer Vision, pp. 9297-9307, 2019.
S. Gupta, P. Arbelaez, and J. Malik. "Perceptual Organization and Recognition of Indoor Scenes from RGB-D Images". In Proceedings of the IEEE Conference on Computer Vision and Pattern Recognition, pp. 564-571, 2013.
M. Firman, O. Mac Aodha, S. Julier, and G. J. Brostow. "Structured Prediction of Unobserved Voxels From a Single Depth Image". In Proceedings of the IEEE Conference on Computer Vision and Pattern Recognition, pp. 5431-5440, 2016.
A. Dai, A. X. Chang, M. Savva, M. Halber, T. Funkhouser, and M. Nießner. "ScanNet: Richly-annotated 3D Reconstructions of Indoor Scenes". In Proceedings of the IEEE Conference on Computer Vision and Pattern Recognition, pp. 5828-5839, 2017.
S. Song, F. Yu, A. Zeng, A. X. Chang, M. Savva, and T. Funkhouser. "Semantic Scene Completion from a Single Depth Image". In Proceedings of the IEEE Conference on Computer Vision and Pattern Recognition, pp. 1746-1754, 2017.
C. Choy, J. Gwak, and S. Savarese. "4D Spatio-Temporal ConvNets: Minkowski Convolutional Neural Networks". In Proceedings of the IEEE Conference on Computer Vision and Pattern Recognition, pp. 3075-3084, 2019.
Y. M. Kim, N. J. Mitra, D.- M. Yan, and L. Guibas. "Acquiring 3D indoor environments with variability and repetition". ACM Transactions on Graphics, 31(6):138:1-138:11, 2012.
D. Schiebener, A. Schmidt, N. Vahrenkamp, and T. Asfour. "Heuristic 3D object shape completion based on symmetry and scene context". In 2016 IEEE/RSJ International Conference on Intelligent Robots and Systems (IROS), pp. 74-81. IEEE, 2016.
A. Monszpart, N. Mellado, G. J. Brostow, and N. J. Mitra. "RAPTER: Rebuilding Man-made Scenes with Regular Arrangements of Planes". ACM Trans. Graph., 34(4):103-1, 2015.
S. Gupta, P. Arbelaez, R. Girshick, and J. Malik. "Aligning 3D Models to RGB-D Images of Cluttered Scenes". In Proceedings of the IEEE conference on computer vision and pattern recogni-tion, pp. 4731-4740, 2015.
A. Geiger and C. Wang. "Joint 3D Object and Layout Inference from a Single RGB-D Image". In German Conference on Pattern Recognition, pp. 183-195. Springer, 2015.
Y. Li, A. Dai, L. Guibas, and M. Nießner. "Database-Assisted Object Retrieval for Real-Time 3D Reconstruction". In Computer Graphics Forum, vol. 34, pp. 435-446. Wiley Online Library, 2015.
H. Jiang and J. Xiao. "A Linear Approach to Matching Cuboids in RGBD Images". In Proceedings of the IEEE conference on computer vision and pattern recognition, pp. 2171-2178, 2013.
S. Song and J. Xiao. "Deep Sliding Shapes for Amodal 3D Object Detection in RGB-D Images". In Proceedings of the IEEE Conference on Computer Vision and Pattern Recognition, pp. 808-816, 2016.
G. Riegler, A. O. Ulusoy, H. Bischof, and A. Geiger. "OctNetFusion: Learning Depth Fusion from Data". In 2017 International Conference on 3D Vision (3DV), pp. 57-66. IEEE, 2017.
M. Tatarchenko, A. Dosovitskiy, and T. Brox. "Octree Generating Networks: Efficient Convolutional Architectures for High-resolution 3D Outputs". In Proceedings of the IEEE International Conference on Computer Vision, pp. 2088-2096, 2017.
B. Wu, X. Zhou, S. Zhao, X. Yue, and K. Keutzer. "SqueezeSegV2: Improved Model Structure and Unsupervised Domain Adaptation for Road-Object Segmentation from a LiDAR Point Cloud". In 2019 International Conference on Robotics and Automation (ICRA), pp. 4376-4382. IEEE, 2019.
Y. Wang, T. Shi, P. Yun, L. Tai, and M. Liu. "PointSeg: Real-Time Semantic Segmentation Based on 3D LiDAR Point Cloud". arXiv preprint arXiv:1807.06288, 2018.
A. Dewan and W. Burgard. "DeepTemporalSeg: Temporally Consistent Semantic Segmentation of 3D LiDAR Scans". arXiv preprint arXiv:1906.06962, 2019.
B. Yang, M. Liang, and R. Urtasun. "HDNET: Exploiting HD Maps for 3D Object Detection". In Conference on Robot Learning, pp. 146-155, 2018.
E. E. Aksoy, S. Baci, and S. Cavdar. "SalsaNet: Fast Road and Vehicle Segmentation in LiDAR Point Clouds for Autonomous Driving". arXiv preprint arXiv:1909.08291, 2019.
C. R. Qi, L. Yi, H. Su, and L. J. Guibas. "PointNet++: Deep Hierarchical Feature Learning on Point Sets in a Metric Space". In Advances in neural information processing systems, pp. 5099-5108, 2017.
Q. Hu, B. Yang, L. Xie, S. Rosa, Y. Guo, Z. Wang, N. Trigoni, and A. Markham. "RandLA-Net: Efficient Semantic Segmentation of Large-Scale Point Clouds". In Proceedings of the IEEE/CVF Conference on Computer Vision and Pattern Recognition, pp. 11108-11117, 2020.
M. Garbade, Y.-T. Chen, J. Sawatzky, and J. Gall. "Two Stream 3D Semantic Scene Completion". In Proceedings of the IEEE Conference on Computer Vision and Pattern Recognition Workshops, pp. 0-0, 2019.
S. Liu, Y. Hu, Y. Zeng, Q. Tang, B. Jin, Y. Han, and X. Li. "See and Think: Disentangling Semantic Scene Completion". In Advances in Neural Information Processing Systems, pp. 263-274, 2018.
C. Hane, C. Zach, A. Cohen, R. Angst, and M. Pollefeys. "Joint 3D Scene Reconstruction and Class Segmentation". In Proceedings of the IEEE Conference on Computer Vision and Pattern Recognition, pp. 97-104, 2013.
M. Blaha, C. Vogel, A. Richard, J. D. Wegner, T. Pock, and K. Schindler. "Large-Scale Semantic 3D Reconstruction: an Adaptive Multi-Resolution Model for Multi-Class Volumetric Labeling". In Proceedings of the IEEE Conference on Computer Vision and Pattern Recognition, pp. 3176-3184, 2016.
A. Dai and M. Nießner. "3DMV: Joint 3D-Multi-View Prediction for 3D Semantic Scene Segmentation". In Proceedings of the European Conference on Computer Vision (ECCV), pp. 452-468, 2018.
K. Tateno, F. Tombari, and N. Navab. "When 2.5D is not enough: Simultaneous reconstruction, segmentation and recognition on dense SLAM". In 2016 IEEE international conference on robotics and automation (ICRA), pp. 2295-2302. IEEE, 2016.
S. Liu, S. De Mello, J. Gu, G. Zhong, M.-H. Yang, and J. Kautz. "Learning Affinity via Spatial Propagation Networks". In Advances in Neural Information Processing Systems, pp. 1520-1530, 2017.
J. Ku, A. Harakeh, and S. L. Waslander. "In Defense of Classical Image Processing: Fast Depth Completion on the CPU". In 2018 15th Conference on Computer and Robot Vision (CRV), pp. 16-22. IEEE, 2018.
J. Li, Y. Liu, X. Yuan, C. Zhao, R. Siegwart, I. Reid, and C. Cadena. "Depth Based Semantic Scene Completion with Position Importance Aware Loss". IEEE Robotics and Automation Letters, 5(1):219-226, 2019.
H. Caesar, V. Bankiti, A. H. Lang, S. Vora, V. E. Liong, Q. Xu, A. Krishnan, Y. Pan, G. Baldan, and O. Beijbom. "nuScenes: A multimodal dataset for autonomous driving". In Proceedings of the IEEE/CVF Conference on Computer Vision and Pattern Recognition, pp. 11621-11631, 2020.

(56) References Cited

OTHER PUBLICATIONS

T. Cortinhal, G. Tzelepis, and E. E. Aksoy. "SalsaNext: Fast Uncertainty-aware Semantic Segmentation of LiDAR Point Clouds for Autonomous Driving". arXiv preprint arXiv:2003.03653, 2020.

\* cited by examiner

METHODS AND SYSTEMS FOR SEMANTIC SCENE COMPLETION FOR SPARSE 3D DATA

TECHNICAL FIELD

The present disclosure relates to methods and systems for generating semantically completed 3D data from sparse 3D data such as point clouds.

BACKGROUND

Scene understanding, otherwise referred to as perception, is one of the primary tasks in autonomous driving, robotics, and surveillance systems. Cameras, radars, and light detection and ranging sensors are different types of sensors which are generally used by an autonomous vehicle, robot, or surveillance system to sense a scene surrounding the autonomous vehicle, robot, or surveillance system. A scene refers to the environment (including objects and background) that is represented in images captured by a camera, such as an optical camera, or a point cloud generated by a radar, or a LIDAR sensor. The images captured by a camera are frames of 2D data or the point clouds generated by a radar or LiDAR sensor are frames of 3D data. The images or point clouds may be missing some data about a scene, for example due to occlusion of the line-of-sight of the sensor and/or due to images or point clouds being captured at a relatively low resolution. Images or point clouds that are captured at low resolution and/or missing some data about a scene may be considered to be sparse data. In some applications, such as navigation and collision avoidance in autonomous vehicles, it may be important to fill in the sparse data with inferred occupancy data (i.e., inferring that certain data points (e.g., pixels of 2D data or voxels of 3D data) should be occupied by an object).

Semantic scene completion (SSC) refers to the task of jointly inferring object occupancy together with object class (typically in frames of 2D data or 3D data). SSC may be used to generate occupancy data for objects that are obscured in the frames of 2D or 3D data (and hence occupancy data is partially missing in the originally captured frames of 2D or 3D data). 2D SSC may be considered to be bird's eye view (BEV) scene completion, in which each 2D pixel in a frame of 2D data (e.g. a BEV image of a scene) is assigned a respective class label, where a negative class label indicates an empty or invalid pixel (i.e., no object occupancy) and a positive class label represents the class of object occupying that pixel. In the case of 3D SSC, the task is to infer volumetric object occupancy together with the object class for each 3D voxel in a frame of 3D data.

It should be noted that SSC is different from a 2D or 3D segmentation task. In 2D or 3D segmentation, the task is to infer the object class for each existing data point (i.e., each pixel or voxel for which there is sensed data), but does not involve inferring occupancy for pixels or voxels that do not have sensed data. SSC typically involves a neural network that is trained to learn the geometry of certain object classes and to generate data (e.g., generating coordinates associated with class labels) to fill in the 2D or 3D space (i.e., 2D pixels or 3D voxels) corresponding to an inferred object. Existing SSC techniques have been developed for completion of dense image data (e.g., image data captured from a relatively small and/or enclosed space such as an indoor room) and/or that require fusion of different data modalities (e.g., fusion of frames of point cloud data with frames of 2D image data, obtained using different types of sensors) to compensate for data sparsity. The limitations of some existing SSC techniques may make such existing techniques less suitable for use processing frames of 2D data or 3D data in a vehicular context.

It would be useful to enable SSC of sparse 3D data, using only a single data modality.

SUMMARY

In various examples, the present disclosure describes methods and systems for SSC of sparse 3D data, such as a sparse 3D point cloud. The disclosed examples may be applied to sparse 3D data captured by a LIDAR sensor on a vehicle, for example. In particular, the disclosed examples may enable semantic completion of sparse 3D data captured from a large, outdoor scene (e.g., in a vehicle context).

Examples of the present disclosure present a unified, single neural network that performs SSC of sparse 3D data (including both scene completion and semantic segmentation). The disclosed examples may be implemented using only data received from a single type of sensor (e.g., using only a dataset of frames of 3D data, such as a point cloud generated by a LIDAR sensor), without requiring fusion of datasets from other types of sensors (e.g., without requiring fusion with a dataset of frames of 2D data, such as a 2D image captured by a camera). This may provide the technical advantage that only one dataset (e.g., a dataset of point clouds) needs to be processed, thus avoiding the need for fusion of multiple datasets and reducing the usage of computer resources (e.g., processing power, memory resources, etc.). Another technical advantage may be faster semantic completion of the sparse 3D data (e.g., enabling generation of a semantically completed 3D tensor in real-time or near real-time as the sparse 3D data is captured), which may be important in applications such as autonomous driving. Further, because there is no need to rely on 2D data captured by a camera (which may have poor quality when images are captured in low-light conditions by the camera), a satisfactory level of accuracy may be maintained even in poor environmental conditions.

Examples of the present disclosure may be used to generate semantically completed 3D tensor representing a scene, which may be useful in the context of autonomous vehicles. For example, semantically completed 3D tensor representing a scene may be used for localization of an autonomous vehicle, path planning and/or trajectory generation for an autonomous vehicle.

In an example aspect, the present disclosure describes a method including: obtaining a frame of sparse 3D data; preprocessing the frame of sparse 3D data into a sparse 3D tensor and a sparse 2D tensor; generating a partially completed 3D tensor from the sparse 3D tensor using a 3D prediction network, the partially completed 3D tensor including voxels missing assigned class labels; generating a semantically completed 2D tensor from the sparse 2D tensor using a 2D prediction network; completing the partially completed 3D tensor to obtain a semantically completed 3D tensor by assigning a given class label, which has been assigned to a given pixel in the semantically completed 2D tensor, to a voxel at a corresponding x-y coordinate in the partially completed 3D tensor; and outputting the semantically completed 3D tensor.

In an example of the preceding example aspect of the method, completing the partially completed 3D tensor may include: dividing the partially completed 3D tensor into a plurality of 2D slices, each 2D slice comprising voxels in a x-y plane at a respective different z coordinate; for each given class label in a set of possible class labels: identifying a slice having a highest number of voxels that have been assigned the given class label; identifying all voxels in the identified slice that have x-y coordinates corresponding to x-y coordinates of pixels in the semantically completed 2D tensor that have been assigned the given class label; and for each identified voxel, assigning the given class label to the identified voxel conditional on the given class label being assigned to at least one neighboring voxel in a neighborhood of the identified voxel.

In an example of the preceding example aspect of the method, when the given class label is not found in the neighborhood of the identified voxel, a next slice corresponding to a next higher z coordinate relative to the identified slice may be identified. The steps of identifying voxels and assigning the given class label may be repeated for the identified next slice.

In an example of any of the preceding example aspects of the method, generating the partially completed 3D tensor may include forward propagating the sparse 3D tensor through a sparse convolutional block, one or more encoder blocks, a dilation block, one or more decoder blocks, and a spatial propagation block, wherein the partially completed 3D tensor is outputted from the spatial propagation block. Generating the semantically completed 2D tensor may include forward propagating the sparse 2D tensor through another sparse convolutional block, one or more other encoder blocks, another dilation block, one or more other decoder blocks, and another spatial propagation block, wherein the semantically completed 2D tensor is outputted from the other spatial propagation block.

In an example of any of the preceding example aspects of the method, the method may include: performing 3D spatial propagation on the semantically completed 3D tensor; and outputting the semantically completed 3D tensor after the 3D spatial propagation.

In an example of any of the preceding example aspects of the method, preprocessing the frame of sparse 3D data into a sparse 3D tensor may include: converting the sparse 3D data into a range image; performing depth completion on the range image to obtain a depth-completed range image; performing surface feature extraction on the depth-completed range image to obtain surface normal feature vectors corresponding to respective voxels of the sparse 3D tensor; performing a truncated signed distance function (TSDF) computation on the depth-completed range image to obtain TSDF vectors corresponding to respective voxels of the sparse 3D tensor; and concatenating the respective surface normal feature vector and the respective TSDF vector for each voxel of the sparse 3D tensor to obtain the sparse 3D tensor comprising a feature vector associated with each voxel.

In an example of any of the preceding example aspects of the method, preprocessing the frame of sparse 3D data into a sparse 2D tensor may include: projecting data points of the frame of sparse 3D data into pixels of a 2D bird's eye view (BEV) image in an x-y plane; and computing a feature vector for each pixel, each feature vector encoding intensity data projected from the data points of the sparse 3D data.

In another example aspect, the present disclosure describes a computing system including a processing unit configured to execute instructions to cause the computing system to: obtain a frame of sparse 3D data; preprocess the frame of sparse 3D data into a sparse 3D tensor and a sparse 2D tensor; generate a partially completed 3D tensor from the sparse 3D tensor using a 3D prediction network, the partially completed 3D tensor including voxels missing assigned class labels; generate a semantically completed 2D tensor from the sparse 2D tensor using a 2D prediction network; complete the partially completed 3D tensor to obtain a semantically completed 3D tensor by assigning a given class label, which has been assigned to a given pixel in the semantically completed 2D tensor, to a voxel at a corresponding x-y coordinate in the partially completed 3D tensor; and output the semantically completed 3D tensor.

In an example of the preceding example aspect of the computing system, the processing unit may be configured to execute instructions to cause the computing system to complete the partially completed 3D tensor by: dividing the partially completed 3D tensor into a plurality of 2D slices, each 2D slice comprising voxels in a x-y plane at a respective different z coordinate; for each given class label in a set of possible class labels: identifying a slice having a highest number of voxels that have been assigned the given class label; identifying all voxels in the identified slice that have x-y coordinates corresponding to x-y coordinates of pixels in the semantically completed 2D tensor that have been assigned the given class label; and for each identified voxel, assigning the given class label to the identified voxel conditional on the given class label being assigned to at least one neighboring voxel in a neighborhood of the identified voxel.

In an example of the preceding example aspect of the computing system, when the given class label is not found in the neighborhood of the identified voxel, a next slice corresponding to a next higher z coordinate relative to the identified slice may be identified. The steps of identifying voxels and assigning the given class label may be repeated for the identified next slice.

In an example of any of the preceding example aspects of the computing system, the 3D prediction network and the 2D prediction network may be instances of a common neural network with different dimensionality.

In an example of the preceding example aspect of the computing system, the common neural network may include: a sparse convolutional block; one or more encoder blocks; a dilation block; one or more decoder blocks; and a spatial propagation block.

In an example of the preceding example aspect of the computing system, each encoder block may include: at least one sparse convolutional block; a squeeze reweight block; an add block; and a class activation map (CAM) block. Each decoder block may include: a sparse deconvolutional block; at least one sparse convolutional block; a squeeze reweight block; an add block; and a pruning block.

In an example of any of the preceding example aspects of the computing system, the processing unit may be configured to execute instructions to further cause the computing system to: perform 3D spatial propagation on the semantically completed 3D tensor; and output the semantically completed 3D tensor after the 3D spatial propagation.

In an example of any of the preceding example aspects of the computing system, the processing unit may be configured to execute instructions to cause the computing system to preprocess the frame of sparse 3D data into a sparse 3D tensor by: converting the sparse 3D data into a range image; performing depth completion on the range image to obtain a depth-completed range image; performing surface feature extraction on the depth-completed range image to obtain surface normal feature vectors corresponding to respective voxels of the sparse 3D tensor; performing a truncated signed distance function (TSDF) computation on the depth-completed range image to obtain TSDF vectors corresponding to respective voxels of the sparse 3D tensor; and concatenating the respective surface normal feature vector and the respective TSDF vector for each voxel of the sparse 3D tensor to obtain the sparse 3D tensor comprising a feature vector associated with each voxel.

In an example of any of the preceding example aspects of the computing system, the processing unit may be configured to execute instructions to cause the computing system to preprocess the frame of sparse 3D data into a sparse 2D tensor by: projecting data points of the frame of sparse 3D data into pixels of a 2D bird's eye view (BEV) image in an x-y plane; and computing a feature vector for each pixel, each feature vector encoding intensity data projected from the data points of the sparse 3D data.

In an example of any of the preceding example aspects of the computing system, the computing system may be a system of an autonomous vehicle, and the frame of sparse 3D data may be obtained from a sensor of the autonomous vehicle.

In another example aspect, the present disclosure describes a non-transitory computer readable medium having instructions encoded thereon. The instructions, when executed by a processing unit of a computing system, cause the computing system to: obtain a frame of sparse 3D data; preprocess the frame of sparse 3D data into a sparse 3D tensor and a sparse 2D tensor; generate a partially completed 3D tensor from the sparse 3D tensor using a 3D prediction network, the partially completed 3D tensor including voxels missing assigned class labels; generate a semantically completed 2D tensor from the sparse 2D tensor using a 2D prediction network; complete the partially completed 3D tensor to obtain a semantically completed 3D tensor by assigning a given class label, which has been assigned to a given pixel in the semantically completed 2D tensor, to a voxel at a corresponding x-y coordinate in the partially completed 3D tensor; and output the semantically completed 3D tensor.

In an example of the preceding example aspect of the computer readable medium, the instructions may cause the computing system to perform any of the preceding example aspects of the method.

In another example aspect, the present disclosure describes a computing system including a processing unit configured to execute instructions to cause the computing system to: implement a 3D prediction network configured to output a partially completed 3D tensor from an inputted sparse 3D tensor; and implement a 2D prediction network configured to output a semantically completed 2D tensor from an inputted sparse 2D tensor. The 3D prediction network and the 2D prediction network are instances of a common neural network with different dimensionality. The common neural network includes: a sparse convolutional block; one or more encoder blocks; a dilation block; one or more decoder blocks; and a spatial propagation block.

In an example of the preceding example aspect of the computing system, each encoder block may include: at least one sparse convolutional block; a squeeze reweight block; an add block; and a class activation map (CAM) block. Each decoder block may include: a sparse deconvolutional block; at least one sparse convolutional block; a squeeze reweight block; an add block; and a pruning block.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
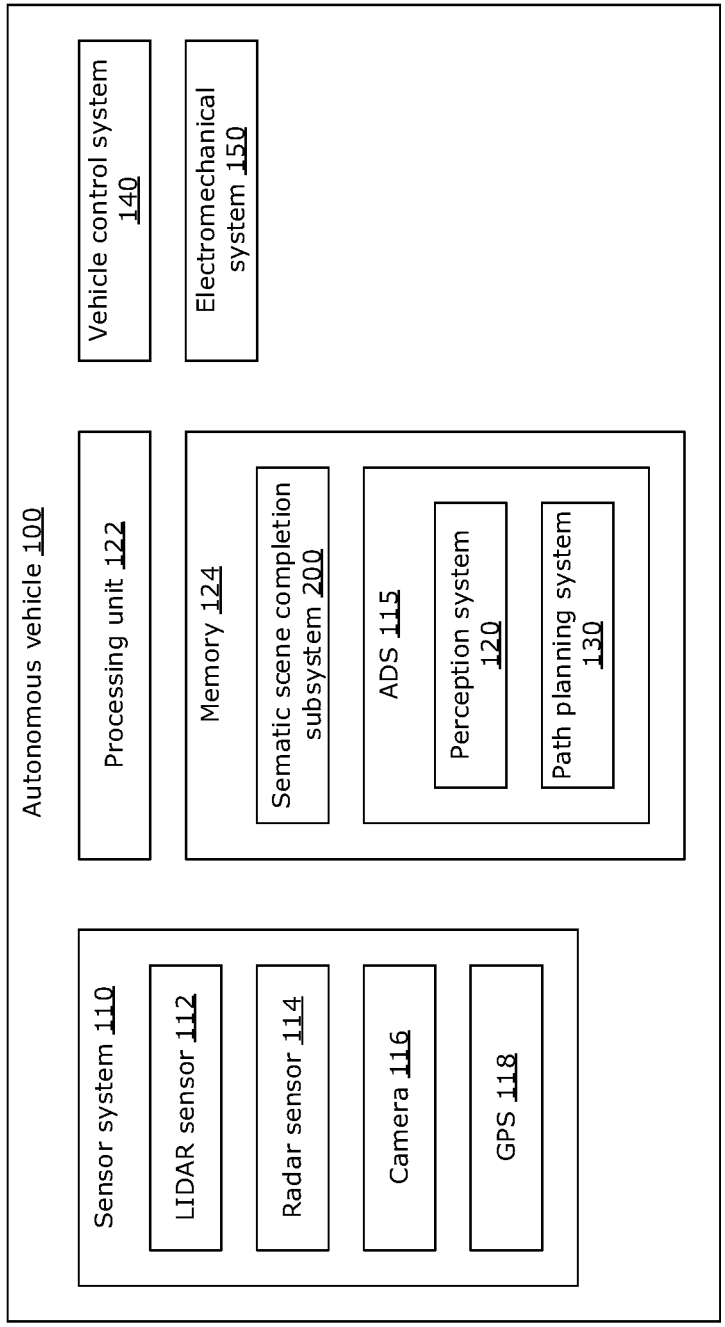
FIG. 1 is a block diagram illustrating an example autonomous vehicle, which may be used to implement examples of the present disclosure.

Some examples of the present disclosure are described in the context of autonomous vehicles. However, the methods and systems disclosed herein may also be suitable for implementation outside of autonomous vehicles, for example in the context of non-vehicular devices (e.g. surveillance systems) and/or semi-autonomous devices. For example, any system that receives or generates sparse 3D data (e.g., point clouds) may use examples of the present disclosure to semantically complete the sparse 3D data (e.g., to generate a semantically completed 3D tensor from received sparse 3D data). Further, examples of the present disclosure may be used to generate a semantically completed 3D tensor to be used as input to any other machine learning-based or non-machine learning-based system. In the present disclosure, a semantically completed 3D tensor refers to a 3D tensor (i.e., a set of voxels in three dimensions) for which missing occupancy data has been inferred (i.e., data has been inferred for voxels that originally lacked sensed data) and also the object class for occupied voxels has been inferred.

Although examples described herein refer to a LIDAR sensor as a sensor for generating frames of sparse 3D data (e.g. point clouds), it should be understood that the teachings of the present disclosure may be relevant to frames of sparse 3D data (e.g. point clouds) that are generated by other types of sensors, including radars and ray-scanning devices, among other possibilities.

To assist in understanding the present disclosure, some existing techniques for semantic scene completion (SSC) are first discussed.

Many existing techniques for SSC are designed for completion of dense data, such as dense depth maps or dense point clouds representing small indoor scenes. SSCNet (e.g., as described by Song et al. "Semantic scene completion from a single depth image" *Proceedings of the IEEE Conference on Computer Vision and Pattern Recognition*, pp. 1746-1754, 2017) and ScanNet (e.g., as described by Dai et al. "Richly-annotated 3d reconstructions of indoor scenes" *Proceedings of the IEEE Conference on Computer Vision and Pattern Recognition*, pp. 5828-5839, 2017) are examples of such existing SSC techniques. However, such existing techniques may not be suitable for semantic completion of sparse data with reduced voxel resolutions (i.e., in which each voxel captures data from a larger real-world 3D space), such as data representing less crowded outdoor scenes that cover a longer horizon (e.g., scenes that may be expected to be encountered by an autonomous vehicle in a driving scenario). SATNet (e.g., as described by Liu et al. "See and think: disentangling semantic scene completion" *Advances in Neural Information Processing Systems*, pp. 263-274, 2018) is another existing technique, which maintains high output resolution using a series of dilated convolutional modules (TNet) to capture a global context of the captured real-world scene, and proposes configurations for early and late fusion of semantic information. Some existing techniques for SSC require fusing of data from multiple viewpoints and/or multiple modalities (e.g., fusing 3D point clouds with 2D images captured from different viewpoints). For example, some existing SSC techniques involve transposing semantic class labels from segmented 2D color images into 3D point clouds. However, these existing SSC techniques are memory intensive, requiring inference of occupancy data or object classification on each set of 2D or 3D data, and fusing of multiple parts of the input data, which may not be appropriate for real-time (or near real-time) applications (e.g., for real-time SSC of data in a driving scenario). Furthermore, techniques that depend on color images may not perform well in less optimal conditions (e.g., low-light and/or poor weather conditions).

In the present disclosure, methods and systems are described that enable SSC of frames of sparse 3D data (e.g., 3D point clouds generated by a LIDAR sensor), without requiring frames of data from other types of sensors or multiple frames of sparse 3D data (e.g., frames of sparse 3D data captured by LIDAR sensors with different fields of view). Compared to some of the existing SSC techniques discussed above, the examples disclosed herein may achieve faster scene completion and semantic segmentation (e.g., enabling real-time or near real-time scene completion and semantic segmentation), may require fewer computer resources (e.g., fewer memory resources and/or less processor power), and may be able to achieve good performance in less optimal conditions (e.g., where a frame of sparse 3D data is captured in low-light and/or poor weather conditions).

As previously mentioned, examples of the present disclosure may be implemented in the context of an autonomous vehicle. For example, a processor of a computing system, such as a computing system of an autonomous vehicle, may use examples of the present disclosure to perform real-time (or near real-time) SSC of a frame of sparse 3D data (e.g., a point cloud generated by a LIDAR sensor of the autonomous vehicle). The resulting semantically completed 3D tensor (inferred from the frame of sparse 3D data) may then be further used as input for performing other inference tasks, such as localization of the autonomous vehicle, path planning or trajectory generation for the autonomous vehicle, among other possibilities. In the context of the present disclosure, the terms real-time or near real-time may be used to refer to the generation of semantically completed 3D tensor within a short period of time (e.g., within 100 ms, or within no more than a few time steps) after the frame of sparse 3D data has been received by the processor of a computing system. For example, the disclosed methods and systems may enable a semantically completed 3D tensor to be generated (i.e., inferred) within the same time step that the frame of sparse 3D data was generated by the LIDAR sensor. To assist in understanding the present disclosure, some components of an autonomous vehicle are first discussed.

FIG. 1 is a block diagram illustrating certain components of an example autonomous vehicle 100, in which examples of the present disclosure may be implemented. As previously mentioned, examples of the methods and systems of the present disclosure may be used in other contexts, including semi-autonomous or non-autonomous vehicles, robots, planes, and other types of devices such as surveillance systems.

In this example, the autonomous vehicle 100 includes a sensor system 110 and an automated driving system (ADS) 115 or an advanced driver assistance system (ADAS) which includes a perception system 120, a path planning system 130. The autonomous vehicle 100 also includes a vehicle control system 140 and an electromechanical system 150. Other systems and components may be included in the autonomous vehicle 100 as appropriate. Various systems and components of the autonomous vehicle may communicate with each other, for example through wired or wireless communication. For example, the sensor system 110 may communicate with the perception system 120; the perception system 120 may communicate with the path planning system 130; the path planning system 130 may communicate with the vehicle control system 140; and the vehicle control system 140 may communicate with the electromechanical system 150.

The sensor system 110 includes various sensors for collecting information about the internal and/or external environment of the autonomous vehicle 100. In the example shown, the sensor system 110 includes a LIDAR sensor 112, a radar sensor 114, a camera 116 and a global positioning system (GPS) 118 for sensing the external environment of the autonomous vehicle 100. The sensor system 110 may include other types of sensors, such as a temperature sensor, precipitation sensor or microphone for sensing the external environment of the autonomous vehicle 100, among other possibilities.

The LIDAR sensor 112 may capture information in a wide viewing angle (e.g., 360° view) about the autonomous vehicle 100. The LIDAR sensor 112 may capture 3D information about the environment, and may generate frames of 3D data. Each frame of 3D data encodes 3D captured information in the form of a set of data points in 3D space (e.g., a 3D point cloud). Each data point in the 3D data represents the 3D coordinates (e.g., x, y and z values in meters) of a sensed object in 3D space (e.g., representing the point of origin from which light is reflected from the object). The LIDAR sensor 112 may capture 3D information and generate frames of 3D data in real-time or near real-time, for example each frame of 3D data may corresponds to a particular time step (e.g., time steps being at regular intervals of 100 ms, or faster). A single frame of 3D data may represent a 3D scene at a given time point. A sequence of frames of 3D data may be referred to as a 3D dataset, representing the 3D scene over a given time period.

A frame of 3D data (i.e. a 3D point cloud) is a set of 3D data points, where each 3D data point may be represented as a vector containing values of x, y, and z coordinates of the 3D data point, and optionally other values (e.g., additional information such as intensity of reflected light or time of detection) of the 3D data point. The 3D data points, each of which may be represented by a respective vector, may be arranged in a data structure, such as a matrix where each row of the matrix corresponds to a respective 3D data point (i.e. each row of the matrix includes the vector representing the respective 3D data point). A class label may be assigned to a 3D data point, where the class label is indicative of a type of an object from a set comprising different types of objects (e.g. vehicle, bicycle, motorcycle, and pedestrian) or the 3D data point) and the class label may be stored as an additional entry in the corresponding vector. An instance label may also be assigned to a 3D data point, which the instance label is indicative of the particular instance of the particular type of object (i.e., as indicated by the class label) that occupies that particular 3D data point, and the instance label may also be stored as an additional entry in the corresponding vector.

It should be noted that, although the 3D data points in a frame of the 3D data (e.g., a 3D point cloud) may be arranged in a matrix (or other data structure), the 3D coordinates encoded in the 3D data points may be irregularly spaced (e.g., depending on the location of objects in the environment). For example, the LIDAR sensor 112 captures 3D information about an external environment of an autonomous vehicle 100 by performing an angular scan of the environment (e.g., a 360° scan). The result is that 3D data points in the frame of 3D data representing objects further away from the LIDAR sensor 112 are spaced further apart than 3D data points in the frame of 3D data representing objects closer towards the LIDAR sensor 112.

Generally, a frame of 3D data (such as 3D point cloud data generated by the LIDAR sensor 112) may be relatively sparse, compared to a frame of 2D data (such as 2D image generated by the camera 116). For example, a typical frame of 2D data generated by the camera 116 may be composed of an ordered array of 1920×1080 pixels and capture a planar field-of-view (FOV). In comparison, a typical frame of 3D data generated by the LIDAR sensor 112 may be composed of an unordered set of points over a 360° FOV, captured over 1800 scanning columns and 16 or 32 scanning rows. Accordingly, the 3D data (e.g., 3D point cloud generated by the LIDAR sensor 112) may be considered to be sparse 3D data. In particular, when the autonomous vehicle 100 is operating in autonomous mode (i.e. driving along a road), the LIDAR sensor 112 may collect information over a large area (e.g., the LIDAR sensor 112 may collect information from an area of 100 m radius or more around the autonomous vehicle 100), which may result in very sparse frames of 3D data being generated.

Using the various sensors 112, 114, 116, 118, the sensor system 110 may collect information about the environment of the autonomous vehicle 100. The sensor system 110 may also collect information about the position and orientation of the autonomous vehicle 100 relative to a frame of reference (e.g., using the GPS 118). The sensor system 110 may further collect information about the autonomous vehicle 100 itself. In such a case, the autonomous vehicle 100 may itself be considered part of the sensed environment. For example, the sensor system 110 may collect information from sensing units (e.g., accelerometers, speedometer, odometer and/or inertial measurement unit) f the autonomous vehicle, which may or may not be part of the sensor system 110, to determine a state of the autonomous vehicle 100, such as linear speed, angular speed, acceleration and tire grip of the autonomous vehicle 100. The sensor system 110 may repeatedly (e.g., in regular intervals) receive information from its sensing units in real-time or near real-time. The sensors 112, 114, 116, 118 of the sensor system 110 may in turn provide data in real-time or near real-time to other components of the autonomous vehicle 100.

The sensor system 110 communicates sensor data, including 2D data and 3D data to the perception system 120. The perception system 120 is part of the ADS 115 or ADAS (not shown), which may be stored as software in a memory 124 of the autonomous vehicle 100 and which may be executed by a processing unit 122 of the autonomous vehicle 100. It should be understood that, in some examples, processing of the 2D and 3D data may be performed by a computing system that is external to the autonomous vehicle 100 (i.e., some or all of the perception system 120 may be implemented by software that is executed by an external computing system) and that is in communication with the autonomous vehicle 100 (assuming there is a communication link that is sufficient to support the transfer of data between the autonomous vehicle 100 and the external computing system). The processing unit 122 may be any processor (e.g., a microprocessor, graphics processing unit (GPU), central processing unit (CPU) with a hardware accelerator, digital signal processor (DSP), tensor processing unit (TPU), or other computational element) that is configured to execute instruction stored in the memory 124. The memory 124 may include a non-transitory medium that stores instructions, data and/or software systems or modules for execution by the processing unit 122 to carry out the example methods described herein. In particular, the memory 124 may store instructions of a semantic scene completion (SSC) subsystem 200 for execution by the processing unit 122, as disclosed herein.

The memory 124 may include any suitable volatile and/or non-volatile storage and retrieval unit. For example, the memory 124 may include one or more of random access memory (RAM), read only memory (ROM), hard disk, optical disc, subscriber identity module (SIM) card, memory stick, secure digital (SD) memory card, and the like.

In addition to executing instructions of the SSC subsystem 200, as discussed further below, the processing unit 122 may also execute other instructions stored in the memory 124 to perform other inference tasks. For example, the perception system 120 may also perform other computer vision tasks on the sensor data (e.g., including both 2D data and 3D data) to detect and identify objects. Such tasks may also be referred to as perception tasks. The perception system 120 may implement other neural networks, in addition to those disclosed herein, to perform such tasks.

The vehicle control system 140 serves to control operation of the autonomous vehicle 100. The vehicle control system 140 may be used to provide full, partial or assistive control of the autonomous vehicle 100. The vehicle control system 140 may serve to fully or partially control operation of the electromechanical system 150, when the autonomous vehicle 100 is operating autonomously or semi-autonomously, based on the signals received from the ADS 115 or ADAS. The vehicle control system 140 generates control signals to control the electromechanical system 150 of the autonomous vehicle 100, such as control signals to control a steering angle, the speed and the acceleration of the autonomous vehicle 100.

The electromechanical system 150 receives control signals from the vehicle control system 140 to operate the mechanical components of the autonomous vehicle 100. The electromechanical system 150 effects physical operation of the autonomous vehicle 100. For example, the electromechanical system 150 may include an engine, a transmission, wheels, turn signals, brake lights, fans and windows, among other components.

The autonomous vehicle 100 may include other components that are not shown, including, for example, a user interface system and a wireless communication system (e.g., including an antenna). These other components may also provide input to and/or receive output from the above-described systems. The autonomous vehicle 100 may communicate with an external system, for example an external map database that provides a map used for localization of the autonomous vehicle 100. The autonomous vehicle 100 may also communicate with a network, for example a vehicle network that enables communication (e.g., vehicle-to-vehicle (V2V) communications) among autonomous, semi-autonomous or non-autonomous vehicles, as well as communication with non-vehicular systems (e.g., vehicle-to-everything (V2X) communications) such as roadside infrastructure.

Figure 2:
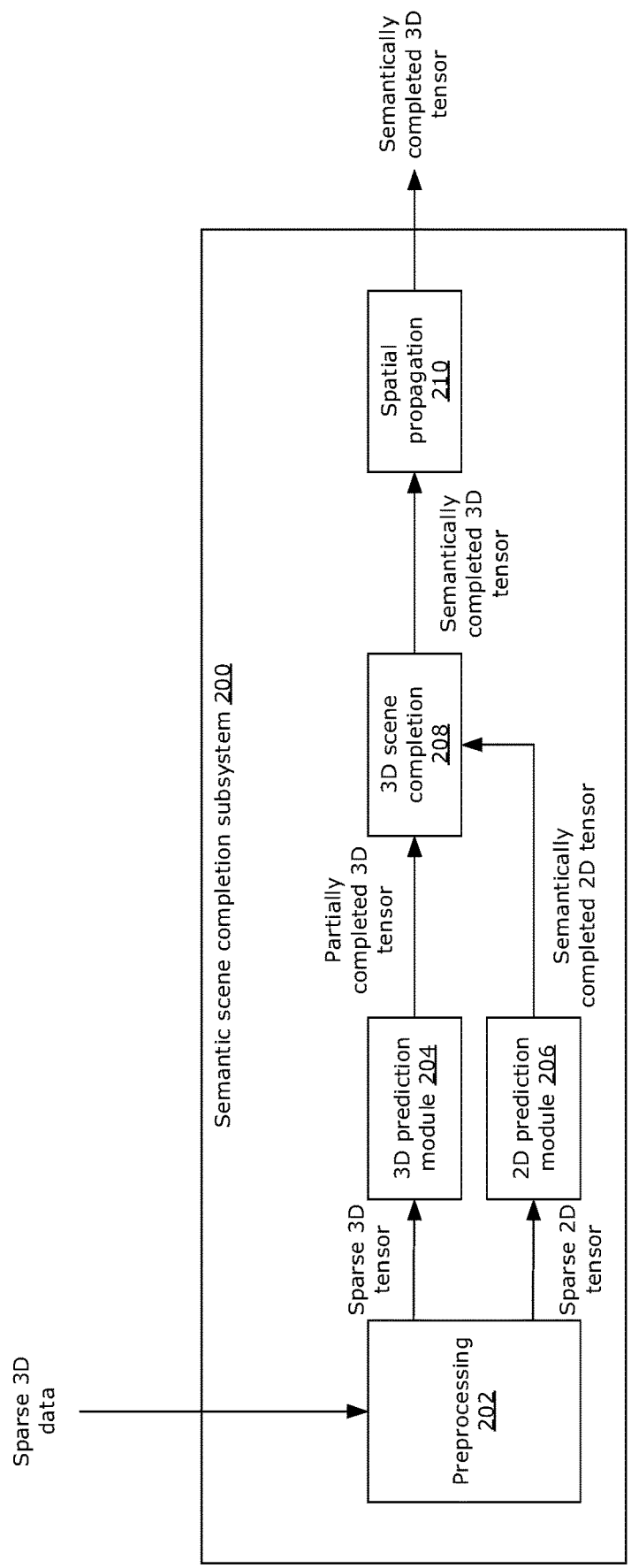
FIG. 2 is a block diagram of an example semantic scene completion subsystem 200, which may be used to implement examples of the present disclosure.

FIG. 2 is a block diagram illustrating example blocks and dataflow that represent the operation of the SSC subsystem 200.

The input to the SSC subsystem 200 is a frame of sparse 3D data (e.g., a 3D point cloud). Generally, the input to the SSC subsystem 200 may be a frame (i.e., data representing a single time point) of any sparse 3D data, which may or may not be a point cloud. It should be noted that the input sparse 3D data to the SSC subsystem 200 may be generated using only a single sensor (e.g., only a 3D point cloud generated by the LIDAR sensor 112), without requiring sensor data from other sensors (e.g., without requiring fusion with a frame of 2D data received from the camera 116).

The frame of sparse 3D data is preprocessed by a preprocessing module 202 into a sparse 3D tensor and a sparse 2D tensor. Preprocessing by the preprocessing module 202 converts the frame of sparse 3D data, which may contain irregularly spaced data, into regularly spaced and sized voxels in a 3D grid (for the sparse 3D tensor), also referred to as voxelization, and into regularly spaced and sized pixels in a 2D grid (for the sparse 2D tensor). It should be noted that, in some examples, the preprocessing of the frame of sparse 3D data into the sparse 3D tensor and the sparse 2D tensor may be performed by a preprocessing module external to the SSC subsystem 200 (i.e., the input to the SSC subsystem 200 may be the sparse 3D tensor and the sparse 2D tensor, instead of the frame of sparse 3D data), and the preprocessing module 202 may not be part of the SSC subsystem 200. Various techniques may be used by the preprocessing module 202 to convert the sparse 3D data into the sparse 3D tensor and the sparse 2D tensor.

In an example, the sparse 2D tensor generated by the preprocessing module 202 is a set of non-empty vectors approximately corresponding to the distribution of the sparse 3D data of a frame of 3D data in a 2D plane (e.g., projection of the 3D data points in the frame of sparse 3D data into pixels in the x-y plane, corresponding to a bird's eye view (BEV)). A feature vector is computed for each pixel in the x-y plane, to encode the intensity data (associated with the 3D data points that have been projected into the pixel in the x-y plane) at the 2D location of that pixel. For example, a feature vector that is computed for a pixel at a given 2D location in the x-y plane, defined by the coordinates (i,j), may be a 7-dimensional feature vector encoding the mean, minimum, and maximum heights and encoded intensity data, and the point density at that (i,j) 2D location.

Figure 3:
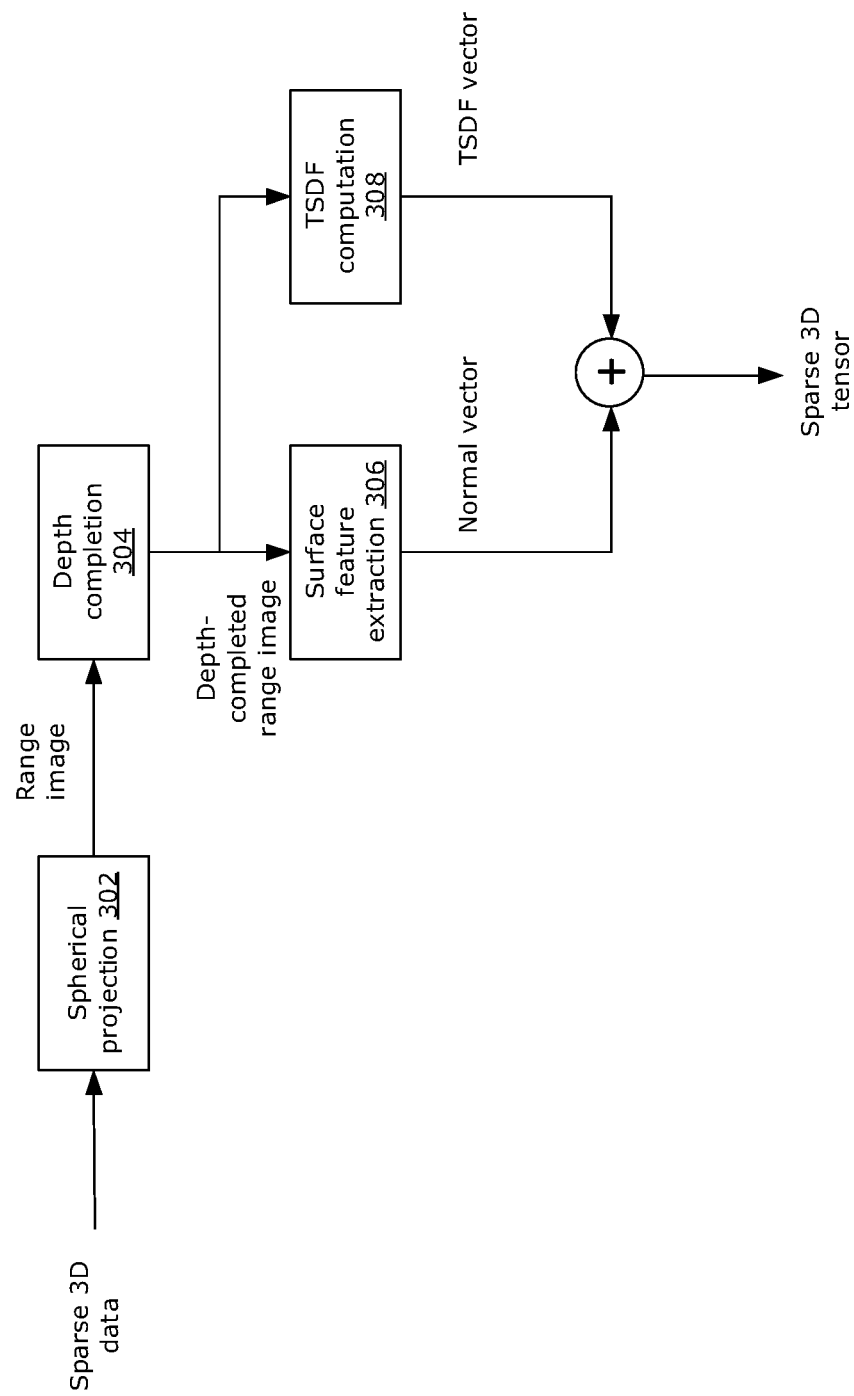
FIG. 3 illustrates an example dataflow for preprocessing sparse 3D data into a sparse 3D tensor, in accordance with examples of the present disclosure.

FIG. 3 is illustrates an example dataflow of how the preprocessing module 202 may generate the sparse 3D tensor from a frame of sparse 3D data. The preprocessing module 202 may, for example, generate the sparse 3D tensor by first converting the frame of sparse 3D data into a range image via spherical projection, performing depth completion on the range image, extracting 3D surface feature vectors from the depth-completed range image, then assigning the extracted 3D surface feature vectors to data points in 3D space. FIG. 3 illustrates various functional blocks representing operations that may be performed by the preprocessing module 202. It should be understood that the blocks illustrated in FIG. 3 are not necessarily discrete components or discrete functions of the preprocessing module 202; the functions that are described below with respective to certain functional blocks may be functions of the preprocessing module 202 as a whole.

The frame of sparse 3D data may be first processed at a spherical projection block 302, where the frame of sparse 3D data is converted into a range image. A range image is a 2D image containing data about the distance from each sensed object in the range image to a specific 3D point (e.g., the 3D point representing the location, in a 3D coordinate system, of the sensor that generated the frame of sparse 3D data). The range image contains data that may be used to extract surface feature vectors representing a sensed 3D surface. To help mitigate the effect of noise on the quality of extracted 3D surface feature vectors, the range image may be processed by a depth completion block 304. The depth completion block 304 performs dynamic depth completion using a dilation method (e.g., as described by Ku et al. "In defense of classical image processing: Fast depth completion on the cpu" In 2018 15*th Conference on Computer and Robot Vision (CRV)*, pages 16-22. IEEE, 2018), to output a relatively smooth range image.

The depth-completed range image may be processed by a surface feature extraction block 306 and a truncated signed distance function (TSDF) computation block 308. Processing by the surface feature extraction block 306 and the TSDF computation block 308 enables the frame of sparse 3D data (which contains data that is irregularly spaced in 3D space) to be into a regular 3D grid (i.e., into voxels), a process that is also referred to as voxelization. At the surface feature extraction block 306, the depth-completed range image is processed to extract 3D normal surface feature vectors representing a sensed 3D surface. The surface feature extraction block 306 may implement any suitable normal computation technique (e.g., as described by Zhou et al. "Normal Estimation for 3D Point Clouds via Local Plane Constraint and Multi-scale Selection", *arXiv:* 1910.08537, 2019). The output of the surface feature extraction block 306 is a 3D normal surface feature vector for each pixel of the depth-completed range image, which is then assigned to a corresponding voxel in 3D space. At the TSDF computation block 308, the depth-completed range image is processed to compute the TSDF vector for each pixel, which is also assigned to a corresponding voxel in 3D space. For example, the TSDF computation block 308 may perform TSDF vector computation, as described by Song et al. "Semantic scene completion from a single depth image", in *Proceedings of the IEEE Conference on Computer Vision and Pattern Recognition*, pp. 1746-1754, 2017. For every voxel, the 3D normal surface feature vector and the TSDF vector are concatenated to obtain a 3D surface feature vector for each voxel that includes both TSDF values and the normal of the 3D surface. The resulting output is the sparse 3D tensor comprising regularly spaced voxels in the 3D space, each associated with a respective 3D surface feature vector. Any voxel that does not contain any data (e.g., there is no sensed object at the 3D location of that voxel) may be left empty (e.g., containing a NULL value or all "0" bits). If there are multiple data points corresponding to the same voxel, the 3D surface feature vectors of the multiple data points are averaged together and the averaged feature vector is assigned to the voxel. For any TSDF-generated coordinates for which there is no corresponding 3D normal surface feature vector (e.g., voxelizing the frame of sparse 3D data does not result in any data corresponding to the TSDF-generated coordinate), zero-padding may be used to complete the vector at that TSDF-generated coordinate.

The surface feature extraction block 306 may use any suitable surface feature extraction algorithm to extract a 3D surface normal feature vector for each pixel of a depth-completed range image, and the TSDF computation block 308 may use any suitable TSDF computation algorithm to compute a TSDF vector for each pixel. In some examples, a more memory efficient (i.e., requiring fewer memory resources) sparse 3D tensor may be obtained by implementing, at the TSDF computation block 308, a TSDF computation based on a modification of the sign-flipped TSDF approach described by Song et al. ("Semantic scene completion from a single depth image". In *Proceedings of the IEEE Conference on Computer Vision and Pattern Recognition*, pages 1746-1754, 2017). TSDF values may be computed from the depth-completed range image, and only coordinates within a defined truncation range (e.g., within the range of existing data points of a frame of 3D data) may be stored.

Although some techniques for preprocessing the sparse 3D data into the sparse 2D tensor and the sparse 3D tensor are described above, it should be understood that these are only examples and are not intended to be limiting. For example, in the generation of the sparse 3D tensor, depth completion of the range image may be omitted. The 3D normal surface vectors may be computed directly from data points (instead of surface feature extraction). In the generation of the sparse 2D tensor, any technique that changes the dimensionality of the sparse 3D data into 2D may be used (e.g., projection onto a 2D plane).

Reference is again made to FIG. 2. The sparse 3D tensor and the sparse 2D tensor (which may be referred to generally as sparse tensors) are received by a 3D prediction module 204 and a 2D prediction module 206, respectively. As will be discussed further below, the output of the 3D prediction network 204 may be a partially completed 3D tensor (meaning semantic completion might not have been successful for all voxels) and the output of the 2D prediction network 206 may be a semantically completed 2D tensor (meaning semantic completion is expected to have been successful for all or almost all pixels). The 3D prediction module 204 and the 2D prediction module 206, in some examples, may each include a trained neural network which is configured to predict the partially completed 3D tensor and the semantically completed 2D tensor, respectively. In some examples, the 3D prediction module 204 and the 2D prediction module 206 may include neural networks which have the same architecture (discussed further below), and differ only in the dimensionality. In an example, the size of the voxel may be 0.2 m in each dimension (this may apply to both the sparse 3D tensor as well as the sparse 2D tensor). The spatial extent of the prediction volume (i.e., the volume in 3D space occupied by the partially completed 3D tensor) in the x-y-z directions may be the ranges [0 m, 51.2 m], [−25.6 m, 25.6 m] and [−2 m, 4.4 m], respectively. Discretizing the prediction volume yields a [256, 256, 32] sized 3D tensor. The prediction modules 204, 206 generate class predictions over the occupied voxels and pixels, respectively. The class predictions may be in the form of a probability distribution over the possible semantic class categories (e.g., over 20 semantic categories).

Figure 4:
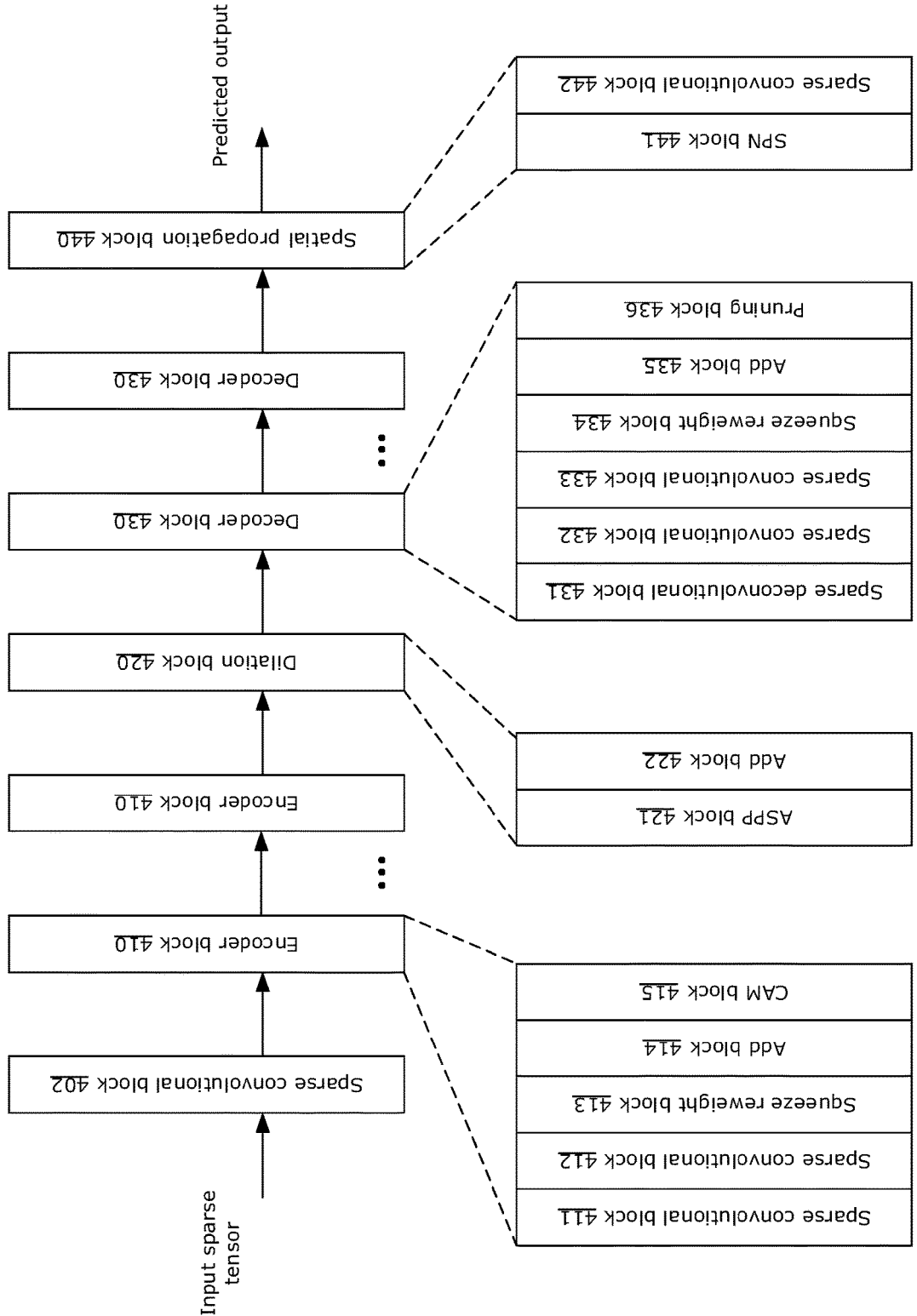
FIG. 4 illustrates an example network architecture, which may be used for a 2D prediction network or a 3D prediction network, in accordance with examples of the present disclosure.

FIG. 4 is a block diagram illustrating an example of a neural network 400, which may be used for the 3D prediction module 204 and the 2D prediction module 206. The neural network 400 may be used by both the 3D prediction module 204 and the 2D prediction module 206, with different dimensionality. That is, the 3D prediction module 204 may include one instance of the neural network 400 configured for processing 3D data (which may be referred to as a 3D prediction network), and the 2D prediction module 206 may include another instance of the neural network 400 configured for processing 2D data (which may be referred to as a 2D prediction network).

The input to the neural network 400 is a sparse tensor (e.g., sparse 2D tensor or sparse 3D tensor, depending on whether the neural network 400 is used for the 2D prediction module 204 or the 3D prediction module 206). Each coordinate in the sparse tensor is associated with a respective feature vector. In particular, the sparse 2D tensor or the sparse 3D tensor may each be generated to contain feature vectors as described above.

The neural network 400 includes a sparse convolutional block 402, one or more encoder blocks 410, a dilation block 420, one or more decoder blocks 430 and a spatial propagation block 440. The neural network 400 includes sparse convolutional blocks, which may be implemented using the Minkowski Engine (ME) (e.g., described in Choy et al. "4d spatio-temporal convnets: Minkowski convolutional neural networks". In *Proceedings of the IEEE Conference on Computer Vision and Pattern Recognition*, pages 3075-3084, 2019), which supports sparse tensor auto-differentiation networks.

Mathematically, a sparse tensor can be defined as a hash-table of coordinates and their corresponding features, as follows:

$$x=[C_{n\times d}, F_{n\times m}]$$

where x is the sparse tensor, C is the coordinates vector, F is the feature vector, n is the number of non-empty voxels, d is the dimension of the coordinates (e.g., d=2 for a 2D space, or d=3 for a 3D space), and m is the dimension of the feature vectors, respectively.

The sparse convolutional block 402 (which may also be referred to as a sparse convolutional layer) may be represented as follows:

$$x_u = \Sigma_{i \in N^D(u,K,C^{in})} W_i x_{u+i} \text{ for } u \in C^{out}$$

where u is the current coordinate, W is the convolutional kernel for the sparse convolutional block 402, K is the kernel size for the sparse convolutional block 402 and $N^D(u, K, C^{in})$ are the set of offsets that are at most [½(K−1)] away from the current coordinate u.

It may be noted that, unlike most conventional convolution computations performed by conventional convolutional block of a conventional convolutional neural network, the generalized convolution computations described above suits generic input and output coordinates, and arbitrary kernel shapes. Thus, the neural network 400 may be used dynamically generate coordinates for generative tasks (e.g., semantic class prediction tasks). The ability to support an arbitrary input shape and multi-dimensional computation enables the neural network 400 to be used in different dimensional spaces. Hence, both the 3D and 2D prediction modules 204, 206 may be implemented using the neural network 400, with differing dimensionality.

Following the sparse convolutional block 402, the neural network 400 includes four primary types of neural network blocks, namely the encoder block 410, dilation block 420, decoder block 430 and spatial propagation block 440.

In an example, there may be three encoder blocks 410, each of which includes the same blocks (or layers), namely: a first sparse convolutional block 411, a second sparse convolutional block 412, a squeeze reweight block 413, an add block 414 and a class activation map (CAM) block 415. Although each encoder block 410 may be include the same blocks, the size of the kernel in the convolutional blocks 411, 412 of each encoder block 410 may increase with each encoder block 410, so that each encoder block 410 captures information from an increasingly larger context. Each sparse convolutional block 411, 412 performs the generalized sparse convolution operation described above. The squeeze reweight block 413 is used to model inter-channel dependencies and help to improve generalization (i.e., ability of the neural network 400 to adapt to data having different data distributions). The squeeze reweight block 413 compresses the context of a neighborhood (i.e., data from a group of neighboring data points) into one point, which may help to better capture information about the local context. For example, the squeeze reweight block 413 may perform operations as described by Wang et al. "Pointseg: Real-time semantic segmentation based on 3d lidar point cloud", *arXiv preprint arXiv:* 1807.06288, 2018. The add block 414 performs element-wise addition of the outputs of the preceding squeeze reweight block 413. The CAM block 415 captures context in a large receptive field, which may help to improve robustness to noise (e.g., dropout noise). For example, the CAM block 415 may perform operations as described by Wu et al. "Squeezesegv2: Improved model structure and unsupervised domain adaptation for road-object segmentation from a lidar point cloud", In 2019 *International Conference on Robotics and Automation (ICRA)*, pages 4376-4382, IEEE, 2019.

The output of the three encoder blocks 410 is a latent representation of the sparse tensor, which is further processed by the dilation block 420. The dilation block includes a sparse atrous spatial pyramid pooling (ASPP) block 421 and an add block 422. The ASPP block 421 is configured to trade-off accurate localization (i.e., smaller field-of-view) with context assimilation (i.e., larger field-of-view). The add block 422 performs element-wise addition of the outputs of the ASPP block 421.

In an example, there may be four decoder blocks 430, each of which is includes the same blocks (or layers), namely: an sparse deconvolutional block 431, a first sparse convolutional block 432, a second sparse convolutional block 433, a squeeze reweight block 434, an add block 435, and a pruning block 436. Although each decoder block 430 may be include the same blocks, the size of the kernel in the deconvolutional block 431 and convolutional blocks 432, 433 of each decoder block 430 may decrease with each decoder block 430, so that each decoder block 430 recovers information from an increasingly more local context (and back to a specific coordinate point). The sparse deconvolutional block 431 performs sparse deconvolution, which may be formulated similarly to the sparse convolution described above. The first and second sparse convolutional blocks 432, 433 each performs the generalized sparse convolution operation described above. The squeeze reweight block 434 may also be similar to the squeeze reweight block 413 of the encoder block 410. The add block 435 performs element-wise addition of the outputs of the preceding squeeze reweight block 434. The pruning block 436 removes redundant coordinates (e.g., new coordinates generated by the preceding blocks (e.g., by the sparse deconvolutional block 431 and the sparse convolutional blocks 432, 433), which are duplicates). Overall, the decoder block 430 performs sparse transposed convolutions to generate new coordinates using an outer product of the weight kernel and input coordinates (received from the dilation block 420). As new coordinates in 3D or 2D are generated (by the cube or square of the kernel size), pruning of redundant coordinates may help to reduce use of memory resources.

The spatial propagation block 440 includes a spatial propagation network (SPN) block 441 and a sparse convolutional block 442 (which may also be referred to as a guidance convolution network in the context of the spatial propagation block 440). The SPN block 441 generates affinity matrices (also referred to as similarity matrices) that represents mutual similarities between the generated coordinates. The affinity matrices are used to guide spatial propagation of the generated coordinates into the target 3D or 2D space, to generate the predicted output of the neural network 400 (i.e., the partially completed 3D tensor or the semantically completed 2D tensor.

Reference is again made to FIG. 2. The 3D prediction module 204 and the 2D prediction module 206 may, in some examples, each be implemented using a respective instance of the neural network 400 described above (with the dimensions of the neural network 400 appropriate adapted for the 3D or 2D input). The 3D prediction module 204 receives a sparse 3D tensor as input and outputs a partially completed 3D tensor. The 2D prediction module 206 receives a sparse 2D tensor as input and outputs a semantically completed 2D tensor (which may also be referred to as a semantically completed 2D image).

The 3D prediction module 204 and the 2D prediction module 206 may each be implemented using a respective neural network (i.e., a 3D prediction network and a 2D prediction network, respectively) that is trained using ground-truth filter masks (i.e., training data that has been masked to only a single class). The training data for training the 3D prediction network may be a set of sparse 3D tensors that include voxels occupied by only a single object class; the training data for training the 2D prediction network may be a set of sparse 2D tensors that include pixels occupied by only a single object class. To train the 3D prediction network, the training data is forward propagated through the neural network, predicted partially completed 3D tensors are obtained and a loss is computed between the outputted prediction and the ground-truth filter masks. The computed loss is then backward propagated to update the parameters (e.g., network weights) of the neural network (e.g., using gradient descent algorithm). Similarly, the train the neural network for the 2D prediction network, the training data is forward propagated through the neural network, predicted semantically completed 2D tensors are obtained and a loss is computed between the outputted prediction and the ground-truth filter masks. The computed loss is then backward propagated to update the parameters (e.g., network weights) of the neural network (e.g., using gradient descent algorithm).

During training of the neural network of the 2D prediction module 206 (i.e., the 2D prediction network), a balance between BEV completion and learning of under-represented semantic classes is achieved using a loss function that combines pixel-wise focal loss and weighted cross entropy loss. The loss function used during training of the 2D prediction network (i.e. used to compute gradients which are backpropagated to update the parameters of the 2D prediction network) may be expressed as follows:

$$\mathcal{L}_{2D}(p, y) = -\left(\alpha \sum_{c \in C} w_c y_c \log(p_c) + \beta \sum_{c \in C} y_c (1 - p_c)^\gamma \log(p_c)\right) + \omega \mathcal{L}_{BCE}(p, y)$$

where C denotes the set of all possible semantic classes; p denotes the predicted class label; y denotes the ground-truth class label; $w_c$ denotes the weight of the weighted cross entropy loss for class c; γ denotes the relaxation parameter of the focal loss; and α, β, ω denote weighting factors that may be empirically set. $L_{BCE}$ denotes the binary cross entropy loss (which may be computed using suitable techniques).

The present disclosure also defines a loss function that is used during training of the neural network of the of the 3D prediction network 204 (i.e. used to compute gradients which are backpropagated to update the parameters of the 3D prediction network) as follows:

$$L_{3D}(p,y) = \lambda L_{completion}(p,y) + (1-\lambda) L_{GA}(p,y)$$

where $L_{completion}$ denotes a completion loss term (which is based on voxelized binary cross entropy loss); $L_{GA}$ denotes a geometric-aware 3D tensor segmentation loss term; and λ is an empirically set constant (which adjusts the balance between $L_{completion}$ and $L_{GA}$.

The completion loss term $L_{completion}$ may be defined as follows:

$$\mathcal{L}_{completion}(p, y) = \sum_{i,j,k} \mathcal{L}_{BCE}(p_{ijk}, y_{ijk})$$

where (i,j,k) is the 3D coordinate of each voxel; and $L_{BCE}$ denotes the binary cross entropy loss over volumetric occupancy. This per-voxel binary cross entropy loss computation may also be used to learn the parameters of the pruning blocks 436 of the neural network 400 at different space scales.

The geometric-aware 3D tensor segmentation loss term may be defined as follows:

$$\mathcal{L}_{GA}(p, y) = -\frac{1}{N} \sum_{i,j,k} \sum_{c=1}^{C} (\xi + \eta M_{LGA}) y_{ijk,c} \log(p_{ijk}, c)$$

where $M_{LGA}$, ξ and η denote signals computed from the same local cubic neighborhood of a given (i,j,k) coordinate; and N denotes the number of voxels in the partially completed 3D tensor.

In particular, $M_{LGA}$ denotes local geometric anisotropy (as defined by Li et al., "Depth based semantic scene completion with position importance aware loss", *IEEE Robotics and Automation Letters*, 5(1): 219-226, 2019), and is defined as follows:

$$M_{LGA} = \sum_{i=1}^{K} (c_p \oplus c_{qi})$$

where K is the number of semantic classes in the set of all possible semantic classes. $M_{LGA}$ is a term that promotes discrete smoothness by penalizing the prediction of many classes within a local neighborhood (e.g., within a group of several neighboring voxels). The inclusion of $M_{LGA}$ in the geometric-aware 3D tensor segmentation loss ensures locally consistent predictions of object class in homogeneous regions (e.g., road center, middle of a wall, etc.), with the tradeoff that the $M_{LGA}$ may inadvertently penalize against inference of boundaries between separate objects belonging to different classes. To mitigate this tradeoff, the η term is an empirically selected constant that accounts for the local arrangement of classes based on the volumetric gradient, and downscales the $M_{LGA}$ term when the local neighborhood contains structured predictions of different classes.

The ξ term helps to smooth out the loss manifold, and is a continuous entropy signal that may be defined as follows:

$$\xi = -\sum_{c \in C'} P(c) \log(P(c))$$

where P(c) is the distribution of class c amongst all classes C' in the local neighborhood.

The geometric-aware 3D tensor segmentation loss term $L_{GA}$ may be understood to be a term that explicitly models loss which explicitly models the relationship between a predicted class of a given voxel and the predicted class in its local neighborhood. ξ may be interpreted as a smooth local entropy term, which down-scales the loss in more easily classified homogeneous regions, enabling the neural network of the 3D prediction module 204 (i.e., the 3D prediction network) to focus on classifying non-uniform regions (e.g., predicting class boundaries) as learning progresses. The inclusion of the $M_{LGA}$ term enables consideration of spatial arrangement of classes and down-scales the loss in structured cubic regions. Thus, the overall loss function for training the 3D prediction network may enable a smooth loss manifold when the local prediction is close to the ground-truth as well as uncluttered, with sharp increases when the local cubic neighborhood is noisy and far off from the ground-truth. The loss function defined in this way may help to speed up convergence of the learned values of the parameters of the 3D prediction network (thus enabling faster and more resource-efficient training) while reducing the chance of stabilizing in local optimums.

It should be noted that, although the both the 3D prediction module 204 and the 2D prediction module 206 may be implemented using different instances of the same neural network 400, the task of 2D semantic scene completion is typically less complex than 3D semantic scene completion. This is because the task of 2D semantic scene completion does not need to account for the local structure of objects along the z dimension, and only needs to perform semantic scene completion in the BEV plane (as defined in the sparse 2D tensor). This enables the neural network of the 2D prediction module 206 to more easily learn the global distribution pattern of semantic classes (such as roads, terrain, and sidewalks) even at far distances, which may enable the 2D prediction network of the 2D prediction module 206 to more accurately assign semantic classes to generated coordinates. In the 3D prediction network of the 3D prediction module 204, the semantic scene completion task may be performed with lower confidence, particularly when certain regions of the sparse 3D tensor has significant noise or occlusions. Thus, the predicted output of the 2D prediction module 206 may be considered to be a semantically completed 2D tensor, while the predicted output of the 3D prediction module 204 may be considered to be only a partially completed 3D tensor. In consideration of this, the SSC subsystem 200 includes a 3D scene completion module 208, to enable the partially completed 3D tensor to be further completed using information from the semantically completed 2D tensor.

The 3D scene completion module 208 performs operations to use inferred pixels in the semantically completed 2D tensor that have been assigned a given semantic class to complete the voxels at corresponding 3D coordinates in the partially completed 3D tensor. In an example, the 3D scene completion module 208 divides the partially completed 3D tensor into a set of 2D slices (e.g., 32 slices). Each 2D slice includes voxels in a BEV viewpoint parallel to the x-y plane of the semantically completed 2D tensor but at different respective z coordinates. Then, for each given class label in the set of possible class labels, the slice having the highest number of voxels assigned with the given class label is identified. For the identified slice, voxels corresponding to 2D pixels (i.e., at the corresponding x, y coordinates) assigned with the given class label are identified. For each identified voxel, the given voxel is assigned the given class in the corresponding 2D pixel if the given class is found in the neighborhood (e.g., neighboring 3×3 voxels) of the given voxel. If there is no match in the neighborhood (i.e., none of the neighboring voxels has the class predicted in the corresponding 2D pixel), the process is repeated for the voxel in the same x-y location in the next higher slice (i.e., the slice having the next higher z coordinate), until the highest slice has been reached. In some examples, instead of starting from the slice having the highest number of voxels assigned with the given class label, all slices starting from the lowest z-coordinate may be processed to identify voxels corresponding to 2D pixels assigned with the given class label (and moving up slice by slice as described above). Processing all slices may be more time-consuming and/or computationally expensive (e.g., requiring more processing power and/or memory resources), but may result in higher accuracy.

This process is repeated for all semantic classes in the set of possible semantic classes. In this way, the 3D scene completion module 208 inserts semantically completed information from the 2D tensor into the 3D space of the 3D tensor. This helps to improve both completion and segmentation metrics of the 3D semantic scene completion task in a relatively efficient manner (e.g., using minimal computing resources). The output of the 3D scene completion module 208 is a semantically completed 3D tensor.

The semantically completed 3D tensor may be further processed by a spatial propagation module 210. The spatial propagation module 210 may be implemented using a suitable spatial propagation network (e.g., a neural network that has been trained to perform three-way spatial propagation). The spatial propagation module 210 may help to correct for any noise resulting from data completion using the semantically completed 2D tensor (e.g., any region with voxels that have been assigned different classes may be corrected to contain only voxels that have been assigned a single class). The semantically completed 3D tensor (with or without processing by the spatial propagation module 210) is outputted from the SSC subsystem 200 (e.g., to be used in other machine learning based or non-machine learning-based systems, such as the path planning system 130 and/or vehicle control system 140 of the autonomous vehicle 100).

Figure 5:
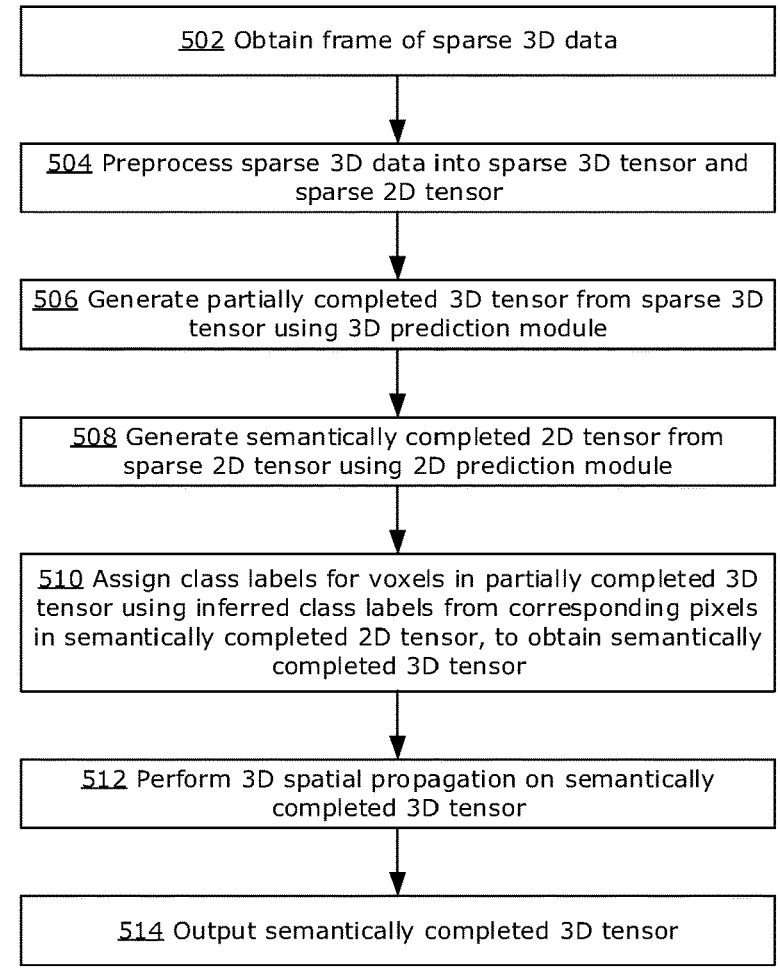
FIG. 5 is a flowchart of an example method for generating a semantically completed 3D tensor from a sparse 3D data, accordance with examples of the present disclosure.

FIG. 5 is a flowchart illustrating an example method 500 for performing SSC of sparse 3D data. The method 500 may be performed by a computing system (e.g., the perception system 120 of the autonomous vehicle 100) using the SSC subsystem 200 described above. In general, the method 500 may be performed by a processing unit of a computing system executing instructions stored in a memory.

At 502, a frame of sparse 3D data is obtained. For example, in the context of the autonomous vehicle 100, the sparse 3D data may be a sparse 3D point cloud obtained from the LIDAR sensor 112 or the radar sensor 114. In general, the sparse 3D data may be any sparse data representing a 3D space.

At 504, the sparse 3D data is preprocessed into a sparse 3D tensor, and also into a sparse 2D tensor. The preprocessing module 202 may perform operations, as described above, to convert the sparse 3D data into a sparse 2D tensor comprising regularly spaced and sized pixels in a 2D grid, corresponding to a BEV x-y plane. The preprocessing module 202 may also perform operations, as described above, to convert the sparse 3D data into a sparse 3D tensor comprising regularly spaced and sized voxels in a 3D grid. For example, converting the sparse 3D data into the sparse 3D tensor may involve: converting the sparse 3D data into a range image, performing depth completion to obtain a depth-completed range image, using surface feature extraction on the depth-completed range image to obtain normal vectors corresponding to respective voxels defined in the sparse 3D tensor, performing TSDF computation on the depth-completed range image to obtain TSDF vectors corresponding to respective voxels in the sparse 3D tensor, and concatenating the respective normal vector and respective TSDF vector for each voxel to obtain a feature vector for each voxel of the sparse 3D tensor.

At 506, a partially completed 3D tensor is generated from the sparse 3D tensor, using the 3D prediction module 204. In particular, the 3D prediction module 204 may include a trained 3D prediction network that is an instance of the neural network 400 described above, including encoder blocks 410 built on sparse convolutional blocks, a dilation block 420, decoder blocks 430 that are also built on sparse convolutional blocks, and a spatial propagation block 440. The sparse 3D tensor may be forward propagated through the blocks 402, 410, 420, 430, 440 of the neural network 400, to generate the partially completed 3D tensor as an output of the final layer of the 3D prediction network. The partially completed 3D tensor includes a voxels that have been assigned class labels, and also includes voxels that have not been assigned any class labels. That is, the inference of class labels for the partially completed 3D tensor is considered to be incomplete (i.e., there are likely voxels that should be assigned a class label, which are missing the appropriate class label).

At 508, a semantically completed 2D tensor is generated from the sparse 2D tensor, using the 2D prediction module 206. In particular, the 2D prediction module 206 may include a trained 2D prediction network that is another instance of the same neural network 400 as that of the neural network of the 3D prediction module 204, but having different dimensionality. The sparse 2D tensor may be forward propagated through the blocks 402, 410, 420, 430, 440 of the neural network 400, to generate the semantically completed 2D tensor as an output of the final layer of the 2D prediction network. Compared to the partially completed 3D tensor, the inference of class labels for the semantically completed 2D tensor is considered to be completed (i.e., all pixels that have should be assigned a class label have been assigned the appropriate class label).

At 510, the partially completed 3D tensor is completed by assigning class labels to voxels from corresponding pixels in the semantically completed 2D tensor, to obtain a semantically completed 3D tensor. As described above, the partially completed 3D tensor may be split into slices, each slice including voxels corresponding to a BEV viewpoint in the x-y plane and at a respective different z-coordinate. For each given class in the set of available semantic classes, the slice having the highest number of voxels assigned with the given class is identified. In the identified slice, all voxels (in the identified slice) at coordinates corresponding to the coordinates of 2D pixels (in the semantically completed 2D tensor)

having the given class are identified. Then, for each identified voxel, the identified voxel is assigned the given class if the given class is found in the neighboring voxels of the identified voxel. If the given class is not found in the neighboring voxels of the identified voxel, the process is repeated for the voxel in the same x-y location in the next higher slice.

At 512, 3D spatial propagation (i.e., spatial propagation in three directions/dimensions) is performed on the semantically completed 3D tensor. This spatial propagation may help to correct for any noise resulting from the completion performed at step 510. In some examples, step 512 may be omitted.

At 514, the semantically completed 3D tensor is outputted. For example, in the context of the autonomous vehicle 100, the semantically completed 3D tensor may be outputted to the path planning system 130 and/or vehicle control system 140, for use in path planning and/or control of the autonomous vehicle 100.

Examples of the present disclosure enables SSC of sparse 3D data, without requiring fusion with data from other modalities (e.g., without requiring fusion of 3D point clouds and 2D optical images). This may result in savings in computer resources (e.g., memory resources and processing power), and may also be more suitable for real-time applications (e.g., for SSC of sparse 3D data in real-time as the sparse 3D data is generated). The semantically completed 3D tensor that is generated using examples of the present disclosure may be used for processing by other neural networks for performing various inference tasks (e.g., path planning in autonomous vehicles).

In various examples, technique are described for preprocessing frames of sparse 3D data into a sparse 2D tensor and a sparse 3D tensor (e.g., using spherical projection into a range image, performing dynamic depth completion, then computing TSDF values from the depth completed range image). A neural network is also disclosed, which may be adapted for prediction of a partially completed 3D tensor as well as a prediction of a semantically completed 2D tensor. Loss functions for training the 2D and 3D prediction networks are also disclosed. A technique for completing a partially completed 3D tensor (containing data inferred using the 3D prediction network), using a semantically completed 2D tensor (containing data inferred using the 2D prediction network), is also disclosed.

In the context of the autonomous vehicle 100, SSC of a frame sparse 3D data (using examples of the present disclosure) may be useful for various self-driving tasks including vehicle localization, path planning, and trajectory generation, among other tasks. For example, accurate real-time generation of a semantically completed 3D tensor from a frame of sparse 3D point cloud (e.g., generated by a LIDAR sensor 112) may be useful for filtering out dynamic objects when the autonomous vehicle 100 is driving on the road. Dynamic object filtering helps to reduce error in traditional localization algorithms used by an ADS 115 or ADAS of the autonomous vehicle 100 to localize the autonomous vehicle 100, hence enabling more accurate localization of the autonomous vehicle 100. The same object filtering technique may also be used together with the semantically completed 3D tensor to help generate maps of the environment (e.g., consisting mostly of landmarks). The semantically completed 3D tensor may also be used to help improve the performance of object detection and segmentation modules of the perception system 120 of the ADS 115 or ADAS of the autonomous vehicle 100, which in turn may help to improve path planning and trajectory generation performed by a planning system 130 of the ADS 115 or ADAS of the autonomous vehicle 100.

The present disclosure describes examples implemented in the context of autonomous vehicles using a DAR sensor (e.g., LIDAR and/or radar sensor). The disclosed examples may also be applicable in other contexts. For example, the present disclosure may be applicable in the fields of remote sensing, robotics, surveillance systems, or any other field that uses a DAR or ray-scanning device to acquire frames of sparse 3D data (e.g., a sparse 3D point cloud).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
  obtaining a frame of sparse 3D data captured by a sensor;
  preprocessing the frame of sparse 3D data into a sparse 3D tensor and a sparse 2D tensor;
  generating a partially completed 3D tensor from the sparse 3D tensor using a 3D prediction network, the partially completed 3D tensor including voxels missing assigned class labels;
  generating a semantically completed 2D tensor from the sparse 2D tensor using a 2D prediction network;
  completing the partially completed 3D tensor to obtain a semantically completed 3D tensor by assigning a given class label, which has been assigned to a given pixel in the semantically completed 2D tensor, to a voxel at a corresponding x-y coordinate in the partially completed 3D tensor; and outputting the semantically completed 3D tensor;

wherein preprocessing the frame of sparse 3D data into the sparse 3D tensor comprises:
converting the sparse 3D data into a range image;
performing depth completion on the range image to obtain a depth-completed range image;
performing surface feature extraction on the depth-completed range image to obtain surface normal feature vectors corresponding to respective voxels of the sparse 3D tensor;
performing a truncated signed distance function (TSDF) computation on the depth-completed range image to obtain TSDF vectors corresponding to respective voxels of the sparse 3D tensor; and
concatenating the respective surface normal feature vector and the respective TSDF vector for each voxel of the sparse 3D tensor to obtain the sparse 3D tensor comprising a feature vector associated with each voxel.

2. The method of claim 1, wherein completing the partially completed 3D tensor comprises:
dividing the partially completed 3D tensor into a plurality of 2D slices, each 2D slice comprising voxels in a x-y plane at a respective different z coordinate;
for each given class label in a set of possible class labels:
identifying a slice having a highest number of voxels that have been assigned the given class label;
identifying all voxels in the identified slice that have x-y coordinates corresponding to x-y coordinates of pixels in the semantically completed 2D tensor that have been assigned the given class label; and
for each identified voxel, assigning the given class label to the identified voxel conditional on the given class label being assigned to at least one neighboring voxel in a neighborhood of the identified voxel.

3. The method of claim 2, wherein when the given class label is not found in the neighborhood of the identified voxel, a next slice corresponding to a next higher z coordinate relative to the identified slice is identified; and wherein the steps of identifying voxels and assigning the given class label are repeated for the identified next slice.

4. The method of claim 1, wherein generating the partially completed 3D tensor comprises forward propagating the sparse 3D tensor through a sparse convolutional block, one or more encoder blocks, a dilation block, one or more decoder blocks, and a spatial propagation block, wherein the partially completed 3D tensor is outputted from the spatial propagation block; and
wherein generating the semantically completed 2D tensor comprises forward propagating the sparse 2D tensor through another sparse convolutional block, one or more other encoder blocks, another dilation block, one or more other decoder blocks, and another spatial propagation block, wherein the semantically completed 2D tensor is outputted from the other spatial propagation block.

5. The method of claim 1, further comprising:
performing 3D spatial propagation on the semantically completed 3D tensor; and
outputting the semantically completed 3D tensor after the 3D spatial propagation.

6. The method of claim 1, wherein preprocessing the frame of sparse 3D data into a sparse 2D tensor comprises:

projecting data points of the frame of sparse 3D data into pixels of a 2D bird's eye view (BEV) image in an x-y plane; and
computing a feature vector for each pixel, each feature vector encoding intensity data projected from the data points of the sparse 3D data.

7. A computing system comprising a processing unit configured to execute instructions to cause the computing system to:
obtain a frame of sparse 3D data captured by a sensor;
preprocess the frame of sparse 3D data into a sparse 3D tensor and a sparse 2D tensor;
generate a partially completed 3D tensor from the sparse 3D tensor using a 3D prediction network, the partially completed 3D tensor including voxels missing assigned class labels;
generate a semantically completed 2D tensor from the sparse 2D tensor using a 2D prediction network;
complete the partially completed 3D tensor to obtain a semantically completed 3D tensor by assigning a given class label, which has been assigned to a given pixel in the semantically completed 2D tensor, to a voxel at a corresponding x-y coordinate in the partially completed 3D tensor; and
output the semantically completed 3D tensor;

wherein the computer system preprocesses the frame of sparse 3D data into a sparse 3D tensor by:
converting the sparse 3D data into a range image;
performing depth completion on the range image to obtain a depth-completed range image;
performing surface feature extraction on the depth-completed range image to obtain surface normal feature vectors corresponding to respective voxels of the sparse 3D tensor;
performing a truncated signed distance function (TSDF) computation on the depth-completed range image to obtain TSDF vectors corresponding to respective voxels of the sparse 3D tensor; and
concatenating the respective surface normal feature vector and the respective TSDF vector for each voxel of the sparse 3D tensor to obtain the sparse 3D tensor comprising a feature vector associated with each voxel.

8. The computing system of claim 7, wherein the processing unit is configured to execute instructions to cause the computing system to complete the partially completed 3D tensor by:
dividing the partially completed 3D tensor into a plurality of 2D slices, each 2D slice comprising voxels in a x-y plane at a respective different z coordinate;
for each given class label in a set of possible class labels:
identifying a slice having a highest number of voxels that have been assigned the given class label;
identifying all voxels in the identified slice that have x-y coordinates corresponding to x-y coordinates of pixels in the semantically completed 2D tensor that have been assigned the given class label; and
for each identified voxel, assigning the given class label to the identified voxel conditional on the given class label being assigned to at least one neighboring voxel in a neighborhood of the identified voxel.

9. The computing system of claim 8, wherein when the given class label is not found in the neighborhood of the identified voxel, a next slice corresponding to a next higher z coordinate relative to the identified slice is identified; and wherein the steps of identifying voxels and assigning the given class label are repeated for the identified next slice.

10. The computing system of claim 7, wherein the 3D prediction network and the 2D prediction network are instances of a common neural network with different dimensionality.

11. The computing system of claim 10, wherein the common neural network comprises:
a sparse convolutional block;
one or more encoder blocks;
a dilation block;
one or more decoder blocks; and
a spatial propagation block.

12. The computing system of claim 11, wherein:
each encoder block comprises:
at least one sparse convolutional block;
a squeeze reweight block;
an add block; and
a class activation map (CAM) block; and
each decoder block comprises:
a sparse deconvolutional block;
at least one sparse convolutional block;
a squeeze reweight block;
an add block; and
a pruning block.

13. The computing system of claim 7, wherein the processing unit is configured to execute instructions to further cause the computing system to:
perform 3D spatial propagation on the semantically completed 3D tensor; and
output the semantically completed 3D tensor after the 3D spatial propagation.

14. The computing system of claim 7, wherein the processing unit is configured to execute instructions to cause the computing system to preprocess the frame of sparse 3D data into a sparse 2D tensor by:
projecting data points of the frame of sparse 3D data into pixels of a 2D bird's eye view (BEV) image in an x-y plane; and
computing a feature vector for each pixel, each feature vector encoding intensity data projected from the data points of the sparse 3D data.

15. The computing system of claim 7, wherein the computing system is a system of an autonomous vehicle, and wherein the sensor capturing the frame of sparse 3D data is mounted on the autonomous vehicle.

* * * * *